United States Patent
Ramachandra et al.

(10) Patent No.: US 11,937,112 B2
(45) Date of Patent: *Mar. 19, 2024

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Pradeepa Ramachandra, Linköping (SE); Icaro L. J. Da Silva, Solna (SE); Helka-Liina Määttanen, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/356,841

(22) Filed: Jun. 24, 2021

(65) Prior Publication Data

US 2021/0321282 A1 Oct. 14, 2021

Related U.S. Application Data

(63) Continuation of application No. 16/067,185, filed as application No. PCT/SE2018/050549 on May 31, 2018, now Pat. No. 11,082,872.

(Continued)

(51) Int. Cl.
*H04W 24/10* (2009.01)
*H04W 16/28* (2009.01)
*H04W 72/542* (2023.01)

(52) U.S. Cl.
CPC ............ *H04W 24/10* (2013.01); *H04W 16/28* (2013.01); *H04W 72/542* (2023.01)

(58) Field of Classification Search
CPC ..... H04W 24/00; H04W 24/10; H04W 16/28; H04W 72/046; H04W 72/1226;
(Continued)

(56) References Cited

U.S. PATENT DOCUMENTS 10,349,330 B2 7/2019 Guerreiro et al.
10,651,899 B2 5/2020 Islam et al.
(Continued)

FOREIGN PATENT DOCUMENTS

CN 102013903 A 4/2011
CN 102752032 A 10/2012
(Continued)

OTHER PUBLICATIONS

Ericsson, "Details of cell quality derivation", 3GPP TSG-RAN WG2 #98, Tdoc R2-1704101, Hangzhou, P.R. of China, May 15-19, 2017, 1-5.
(Continued)

*Primary Examiner* — Warner Wong
(74) *Attorney, Agent, or Firm* — Murphy, Bilak & Homiller, PLLC

(57) ABSTRACT

A radio network node, a wireless device and methods performed therein for handling communication in a wireless communication network are provided. The method performed by the wireless device comprises obtaining an indication indicating which beams to be included in a cell quality derivation of a cell; and performing one or more measurements on one or more beams, which one or more beams are selected based on the obtained indication. Furthermore, a computer program product and a computer readable storage medium are also provided herein.

33 Claims, 12 Drawing Sheets

Related U.S. Application Data

(60) Provisional application No. 62/520,630, filed on Jun. 16, 2017.

(58) Field of Classification Search
CPC .............. H04W 72/08; H04W 72/085; H04W 72/1231; H04W 28/0236; H04W 4/50; H04L 1/0001; H04L 5/006; H04L 41/08; H04L 41/0803; H04L 41/0813
See application file for complete search history.

(56) References Cited

U.S. PATENT DOCUMENTS

| | | | |
|---|---|---|---|
| 11,197,183 B2 * | 12/2021 | Yang | ............ H04W 24/10 |
| 2013/0064129 A1 | 3/2013 | Koivisto et al. | |
| 2015/0080648 A1 | 3/2015 | Flynn et al. | |
| 2016/0150435 A1 | 5/2016 | Baek et al. | |
| 2017/0039505 A1 | 2/2017 | Prabhakara et al. | |
| 2017/0142604 A1 | 5/2017 | Reial et al. | |
| 2017/0208494 A1 * | 7/2017 | Moon | ............ H04L 5/0048 |
| 2017/0317866 A1 | 11/2017 | Stirling-Gallacher et al. | |
| 2017/0324459 A1 * | 11/2017 | Koskela | ............ H04B 7/0617 |
| 2018/0048375 A1 | 2/2018 | Guo et al. | |
| 2018/0270689 A1 | 9/2018 | Akkarakaran et al. | |
| 2018/0323845 A1 | 11/2018 | Chang et al. | |
| 2018/0368149 A1 * | 12/2018 | Raghavan | ......... H04W 72/1231 |
| 2019/0058518 A1 * | 2/2019 | Koskela | ............ H04B 7/0617 |
| 2019/0068262 A1 | 2/2019 | Yu et al. | |
| 2019/0222291 A1 * | 7/2019 | Wang | ............ H04W 88/085 |
| 2019/0223038 A1 | 7/2019 | Yang et al. | |
| 2019/0238210 A1 * | 8/2019 | Tang | ............ H04B 7/0695 |
| 2019/0281509 A1 | 9/2019 | Tidestav et al. | |
| 2019/0327634 A1 * | 10/2019 | Lee | ............ H04W 24/10 |
| 2019/0335376 A1 | 10/2019 | Huang et al. | |
| 2019/0349031 A1 | 11/2019 | Xiang et al. | |
| 2019/0357069 A1 * | 11/2019 | Harada | ............ H04W 72/04 |
| 2019/0386757 A1 | 12/2019 | Li et al. | |
| 2020/0014428 A1 * | 1/2020 | Chen | ............ H04B 7/024 |
| 2020/0120518 A1 | 4/2020 | Geng et al. | |
| 2020/0220749 A1 | 7/2020 | Zhao et al. | |
| 2020/0322071 A1 * | 10/2020 | Li | ............ H04L 5/0048 |
| 2022/0094420 A1 * | 3/2022 | Cui | ............ H04B 7/0404 |

FOREIGN PATENT DOCUMENTS

| | | | | |
|---|---|---|---|---|
| CN | 103476045 A | | 12/2013 | |
| CN | 108810931 A | * | 11/2018 | ............ H04W 24/02 |
| EP | 2485520 A1 | | 8/2012 | |
| KR | 20160063020 A | | 6/2016 | |
| RU | 2538735 C2 | | 1/2015 | |
| WO | 2015080648 A1 | | 6/2015 | |
| WO | 2017012434 A1 | | 1/2017 | |
| WO | 2017039505 A1 | | 3/2017 | |

OTHER PUBLICATIONS

Ericsson, "Measurement configuration for CSI-RS", 3GPP TSG-RAN WG2 #98, Tdoc R2-1704103, Hangzhou, P.R. of China, May 15-19, 2017, 1-7.

Mediatek Inc., "Considerations on Beam Management Framework", 3GPP TSG-RAN WG2 Meeting #98, R2-1704533 (Resubmission of R2-1702769), Hangzhou, China, May 15-19, 2017, 1-6.

Unknown, Author, "Beam Related Measurement Report and Intercell HO in NR", 3GPP TSG-RAN WG2 Meeting #97; R2-1701921; Athens, Greece; Revision of R2-1700532, Feb. 13-17, 2017, pp. 1-7.

Qualcomm, "Beam management for NR", 3GPP TSG RAN1 #88bis, R1-1705581, Spokane, USA, Apr. 3-7, 2017, 1-7.

* cited by examiner

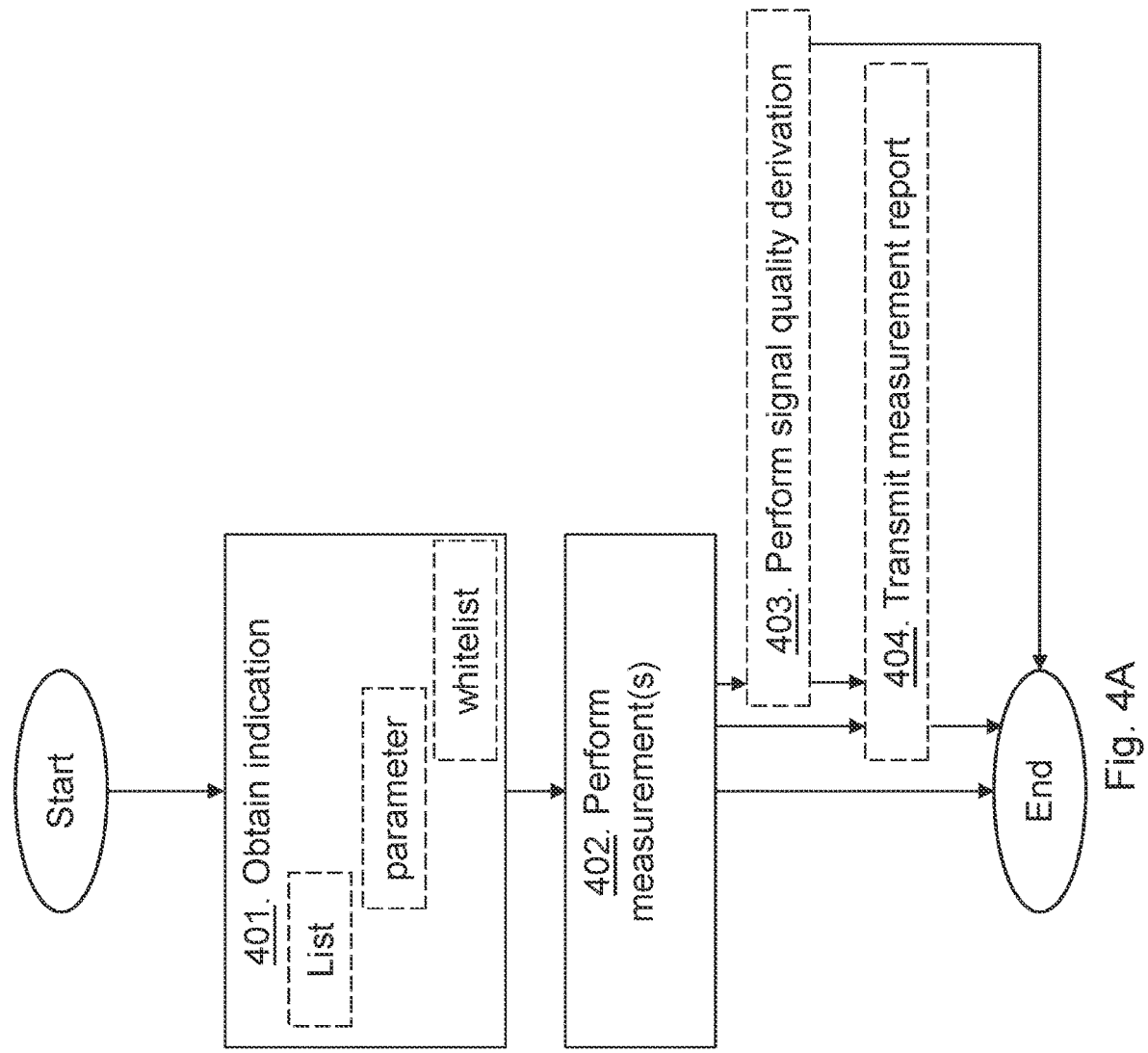

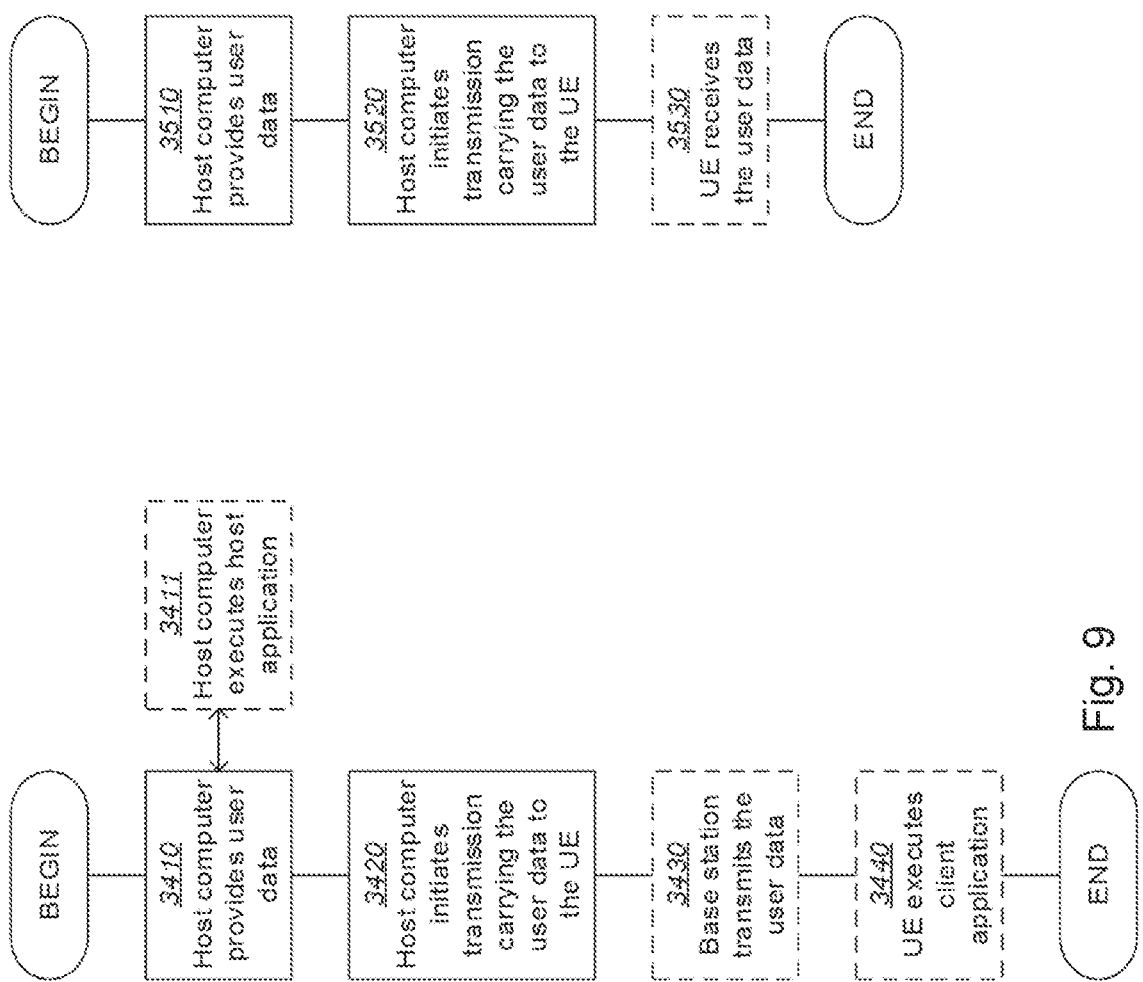

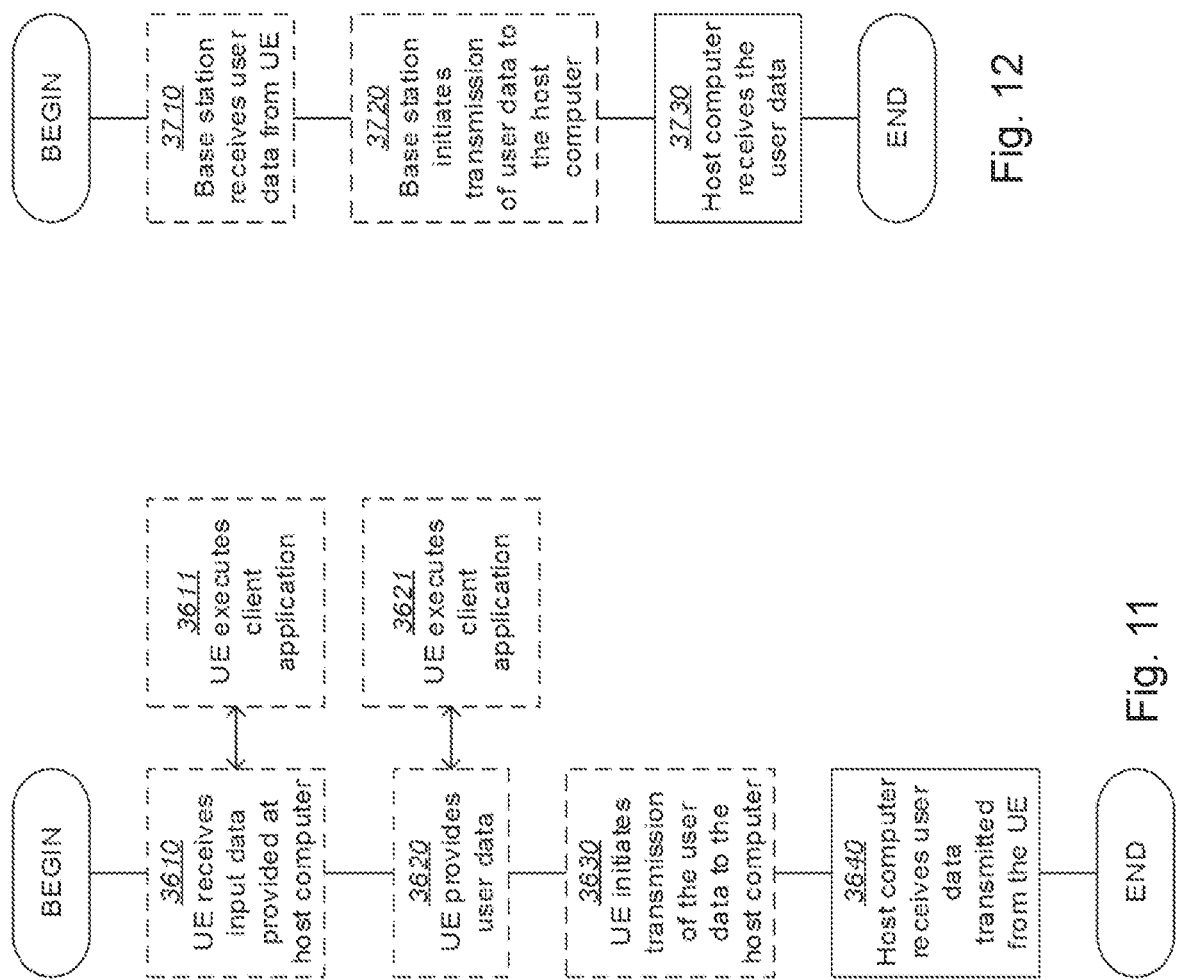

RADIO NETWORK NODE, WIRELESS DEVICE AND METHODS PERFORMED THEREIN

RELATED APPLICATIONS

This application is a continuation of U.S. patent application Ser. No. 16/067,185, filed Jun. 29, 2018, which in turn was the National Stage of International Application No. PCT/SE2018/050549, filed May 31, 2018, which in turn claims the benefit of U.S. Provisional Application No. 62/520,630, filed Jun. 16, 2017, each of which is incorporated by reference in its entirety.

TECHNICAL FIELD

Embodiments herein relate to a radio network node, a wireless device and methods performed therein. Furthermore, a computer program product and a computer readable storage medium are also provided herein. In particular, embodiments herein relate to enable communication of the wireless device e.g. handling measurements, in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area and provides radio coverage over service areas, which may also be referred to as a cell, a beam or a beam group, with each service area is served or controlled by a radio network node such as a radio access node e.g., a Wi-Fi access point or a radio base station (RBS), which in some networks may also be denoted, for example, a "NodeB" or "eNodeB" or "gNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues, for example to specify a Fifth Generation (5G) network and future generation networks. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, receive-side beamforming means that a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

In NR, a measurement model according to FIG. 1A is likely to be agreed, at least partially.

At input A: measurements (beam specific samples) such as a reference signal received power (RSRP) of beams of the gNB, e.g, RSRP of gNB beam 1-k, is input internally to the physical layer.

Layer 1 filtering: internal layer 1 (L1) filtering of the inputs measured at point A. Exact filtering is implementation dependent. How the measurements are actually executed in the physical layer by an implementation (inputs A and Layer 1 filtering) is not constrained by the standard.

$A^1$: The filtered measurements (i.e. beam specific measurements) are reported by layer 1 to layer 3 (L3) after layer 1 filtering.

Layer 3 filtering per beam: Filtering performed on the measurements of the beams provided at point $A^1$. The behaviour of the Layer 3 filters are standardised and the configuration of the layer 3 filters is provided by Radio Resource Control (RRC) signalling. It should be noted that L3 filtering for beam measurements may be referred to as e.g. L2 filtering.

Beam Consolidation/Selection: The measurements of the beams, also referred to as beam specific measurements, are consolidated to derive cell quality if number of beams N is greater than 1 i.e. N>1, else when N=1 the best beam measurement is selected to derive cell quality. The behaviour of the beam consolidation/selection is standardised and the configuration of this module is provided by RRC signalling, i.e., RRC configures parameters. Reporting period at B equals one measurement period at $A^1$.

Beam Selection for beam reporting: Beam specific measurements are consolidated to select the X best beams from which beam information is included in measurement reports. The behaviour of the beam selection is standardised and the configuration of this module is provided by RRC signalling.

Simplifications may be made and X may be configured as N (for cell quality derivation).

B: A measurement (i.e. cell quality) derived from beam-specific measurements reported to layer 3 after the beam consolidation/selection.

Layer 3 filtering: Filtering performed on the measurements provided at point B. The behaviour of the Layer 3 filters are standardised and the configuration of the layer 3 filters is provided by RRC signalling, i.e., RRC configures parameters. Filtering reporting period at C equals one measurement period at B.

C: A measurement after processing in the layer 3 filter. The reporting rate is identical to the reporting rate at point B. This measurement is used as input for one or more evaluation of reporting criteria.

Evaluation of reporting criteria: This checks whether actual measurement reporting is necessary at point D. The evaluation may be based on more than one flow of measurements at reference point C e.g. to compare between different measurements. This is illustrated by input C and $C^1$. The wireless device evaluates the reporting criteria at least every time a new measurement result is reported at point C, $C^1$. The reporting criteria are standardised and the configuration is provided by RRC signalling (wireless device measurements).

D: Measurement report information (message) sent on the radio interface.

In NR, it has been agreed a cell can have more than one Transmission and Reception Point (TRP). One such example is shown in FIG. 1B. In this deployment, cell-A has two TRPs and cell B has only one TRP. Each TRP of Cell-A is supporting the transmission of two beams each. When there are more than one TRP in a single cell, the cell level measurements, e.g., RSRP, or reference signal received quality (RSRQ), will be derived based on the beam level measurements of TRPs. So, the cell quality will be derived for Cell-A using all four beams while the cell-B cell quality is derived from the only beam that is supported.

A protocol stack in each TRP may comprise a Physical Layer (PHY) i.e., Layer 1, Medium Access Layer (MAC), Radio Link Control (RLC), radio Resource Control (RRC) and Packet Data Convergence Control (PDCP).

It should be noted that grouping of beams could be either at cell level, based on Physical Cell ID (PCI) or at a sub-cell level, for Channel State Information—reference signal (CSI-RS) resources the grouping of CSI-RS resources could be explicitly configured either in the measurement object or in the report configuration. The Beam Consolidation/Selection function may consider either the best beam, or the N best beams above a threshold or the N best beams within a relative threshold.

SUMMARY

An object herein is to provide a mechanism that handles measurements for communication of a wireless communication network in an efficient manner.

According to an aspect the object is achieved by providing a method performed by a wireless device for handling communication in a wireless communication network. The wireless device obtains an indication indicating which beams to be included in a cell quality derivation of a cell. The wireless device further performs one or more measurements on one or more beams, which one or more beams are selected based on the obtained indication.

According to another aspect the object is achieved by providing a method performed by a radio network node for handling communication in a wireless communication network. The radio network node transmits an indication to a wireless device, wherein the indication indicates which beams to be included in a cell quality derivation of a cell at the wireless device.

It is furthermore provided herein a computer program product comprising instructions, which, when executed on at least one processor, cause the at least one processor to carry out any of the methods above, as performed by the wireless device or the radio network node. It is additionally provided herein a computer-readable storage medium, having stored thereon a computer program product comprising instructions which, when executed on at least one processor, cause the at least one processor to carry out the method according to any of the methods above, as performed by the wireless device or the radio network node.

According to yet another aspect the object is achieved by providing a wireless device for handling communication in a wireless communication network. The wireless device is configured to obtain an indication indicating which beams to be included in a cell quality derivation of a cell. The wireless device is further configured to perform one or more measurements on one or more beams, which one or more beams are selected based on the obtained indication.

According to yet another aspect the object is achieved by providing a wireless device comprising processing circuitry. The processing circuitry is configured to obtain an indication indicating which beams to be included in a cell quality derivation of a cell. The processing circuitry is further configured to perform one or more measurements on one or more beams, which one or more beams are selected based on the obtained indication.

According to still another aspect the object is achieved by providing a radio network node for handling communication in a wireless communication network. The radio network node is configured to transmit an indication to a wireless device, wherein the indication indicates which beams to be included in a cell quality derivation of a cell at the wireless device.

According to yet another aspect the object is achieved by providing a radio network node comprising processing circuitry. The processing circuitry is configured to transmit an indication to a wireless device, wherein the indication indicates which beams to be included in a cell quality derivation of a cell at the wireless device.

In certain scenarios, there could be reason to not include all TRPs into cell quality derivation. This could be a typical scenario when the load is not evenly distributed amongst TRPs and a cell could afford to allow more wireless devices only in some TRPs. Since more than one beam can, when N is greater than 1, be used to derive the cell level, which beams are selected by the wireless device to determine the cell level quality will impact the outcome of measurements. Thus, embodiments herein allow the radio network node to configure the wireless device to exclude certain beams from a cell in deriving the cell level quality. Moreover, embodiments herein provide methods and apparatuses to control which beams to be included in the cell quality derivation. This enables the serving cell to evaluate the target cell in a correct way as the wireless device may have included e.g.

only those beams indicated, i.e., beams being allowed, when e.g. a handover is triggered. Thus, the measurements for communication of the wireless communication network are handled in an efficient manner.

BRIEF DESCRIPTION OF THE DRAWINGS

Embodiments will now be described in more detail in relation to the enclosed drawings, in which:

FIG. 4A is a flowchart depicting a method performed by a wireless device according to embodiments herein;

FIGS. 9-12 are flowcharts illustrating methods implemented in a communication system including a host computer, a base station and a user equipment.

DETAILED DESCRIPTION

Figure 1A:
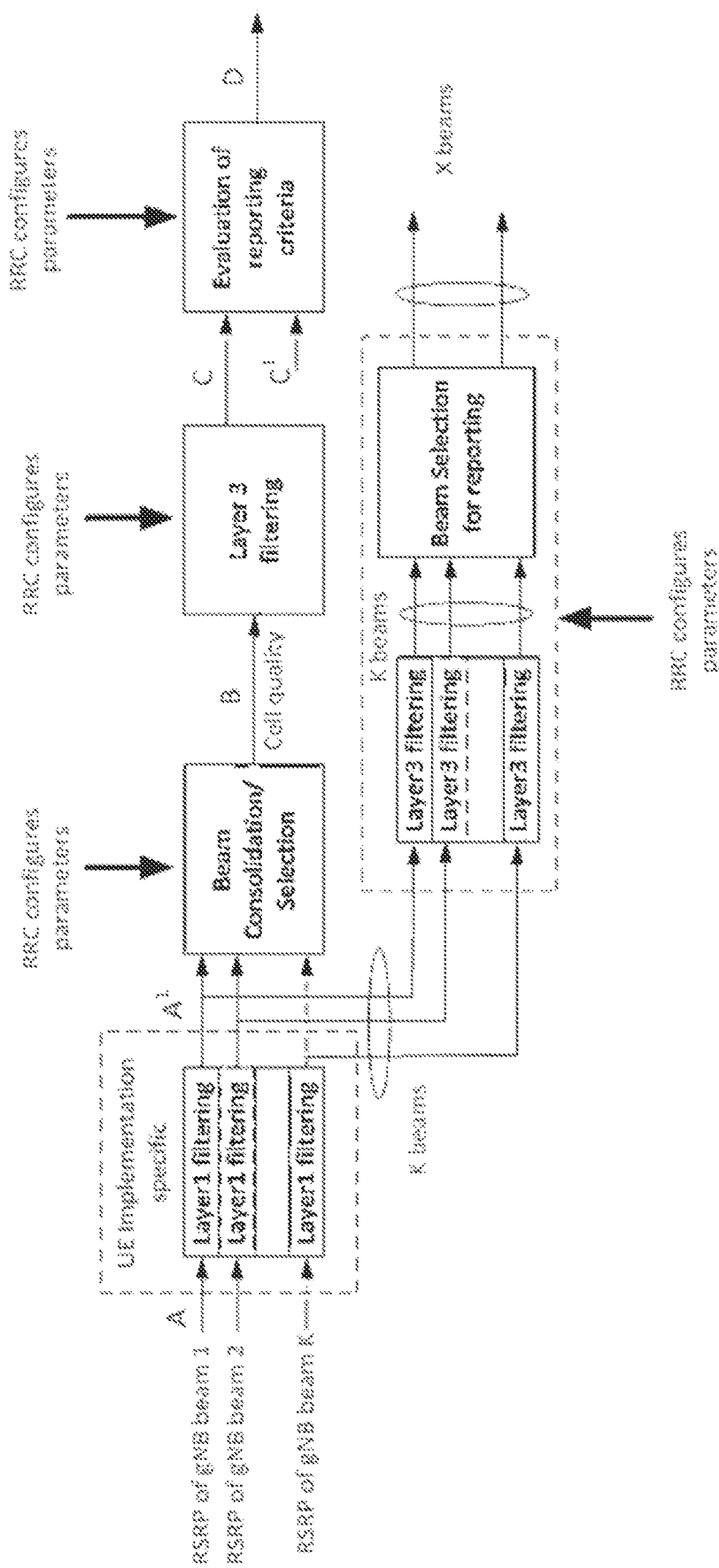
FIG. 1A is a schematic overview depicting a possible measurement model in NR.
Figure 1B:
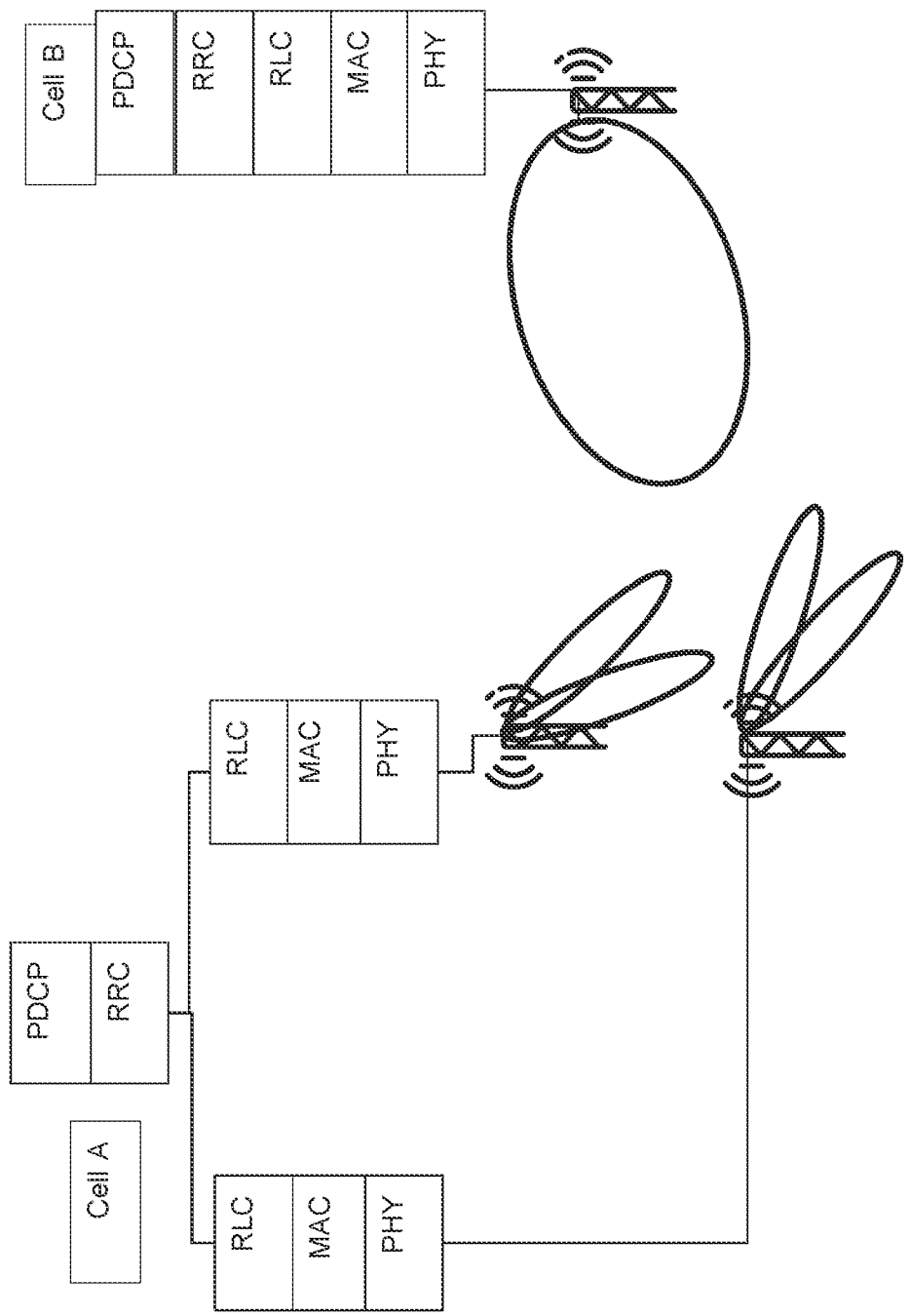
FIG. 1B shows schematically TRPs transmitting beams.
Figure 2:
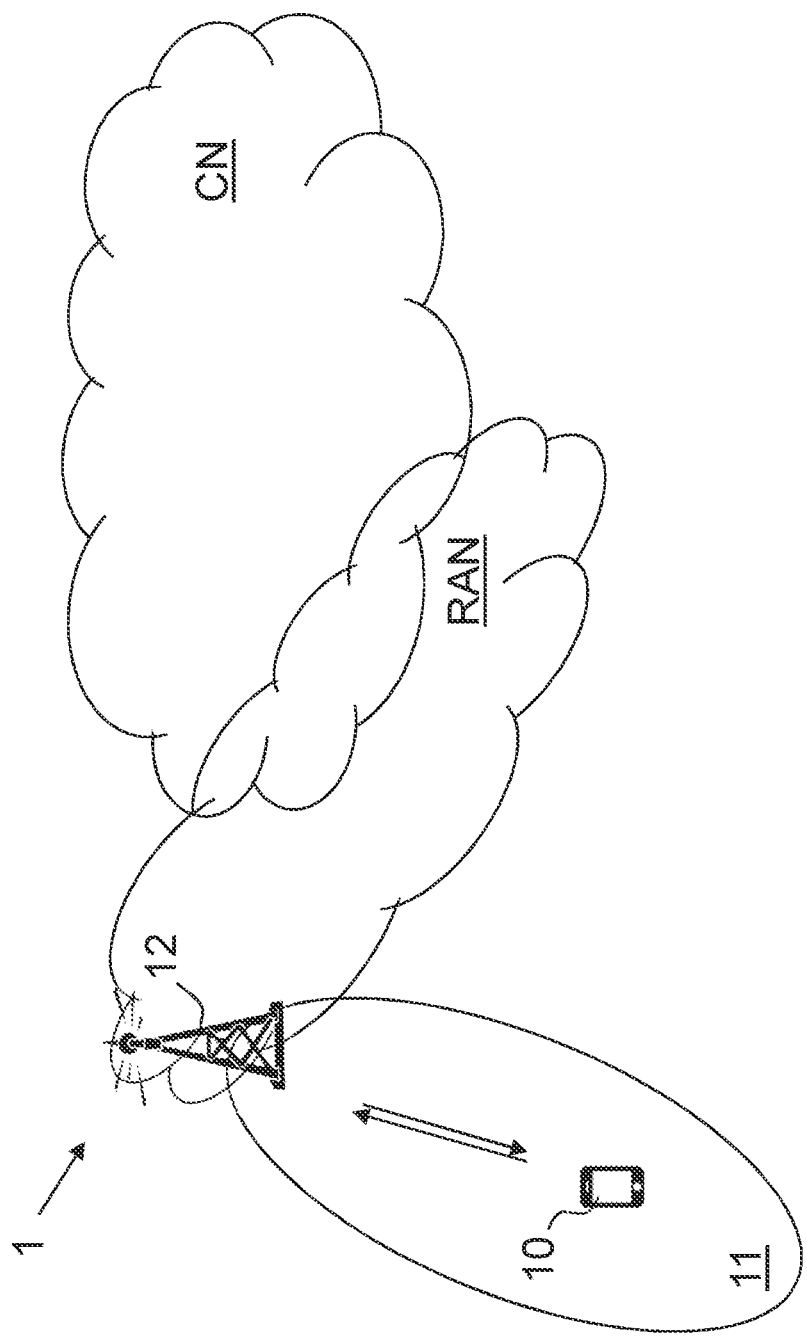
FIG. 2 is a schematic diagram depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as New Radio (NR), Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication networks such as e.g. WCDMA and LTE.

In the wireless communication network 1, a wireless device 10, such as a mobile station, a non-access point (non-AP) STA, a STA, a user equipment and/or a wireless terminal, may communicate via one or more Access Networks (AN), e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a service area.

The wireless communication network 1 comprises a radio network node 12 providing radio coverage over a geographical area referred to as service area 11 or cell, which may be provided by one or more beams or a beam group where the group of beams is covering the service area of a first radio access technology (RAT), such as NR, 5G, LTE, Wi-Fi or similar. A radio network node, such as the radio network node 12, may also serve multiple cells. The radio network node 12 may be a transmission and reception point e.g. a radio-access network node such as a Wireless Local Area Network (WLAN) access point or Access Point Station (AP STA), an access controller, a base station e.g. a radio base station such as a gNodeB, a NodeB, an evolved Node B (eNB, eNodeB), a base transceiver station, a radio remote unit, an Access Point Base Station, a base station router, a transmission arrangement of a radio base station, a stand-alone access point or any other network unit capable of communicating with a wireless device 10 within the service area served by the radio network node 12 depending e.g. on the radio access technology and terminology used. The radio network node 12 communicates with the wireless device 10 with Downlink (DL) transmissions to the wireless device 10 and Uplink (UL) transmissions from the wireless device 10.

According to embodiments herein the wireless device 10 obtains e.g. receives, an indication indicating which beams to be included in a cell quality derivation. Embodiments herein control the beams to be included in the cell quality derivation at the wireless device 10. The wireless device 10 may e.g. obtain a list such as a blackBeamsList e.g. included in a measurement configuration such as in measurement object or in reporting configuration. The obtained blackBeamsList may inform the wireless device 10 about which beams from a cell are supposed to be excluded from the cell quality derivation. Embodiments herein therefore make it possible for the serving cell, e.g. the radio network node 12, to evaluate the target cell in the correct way as the wireless device 10 would have included e.g. only those beams as indicated, i.e., beams being allowed, when e.g. a handover is triggered.

Figure 3:
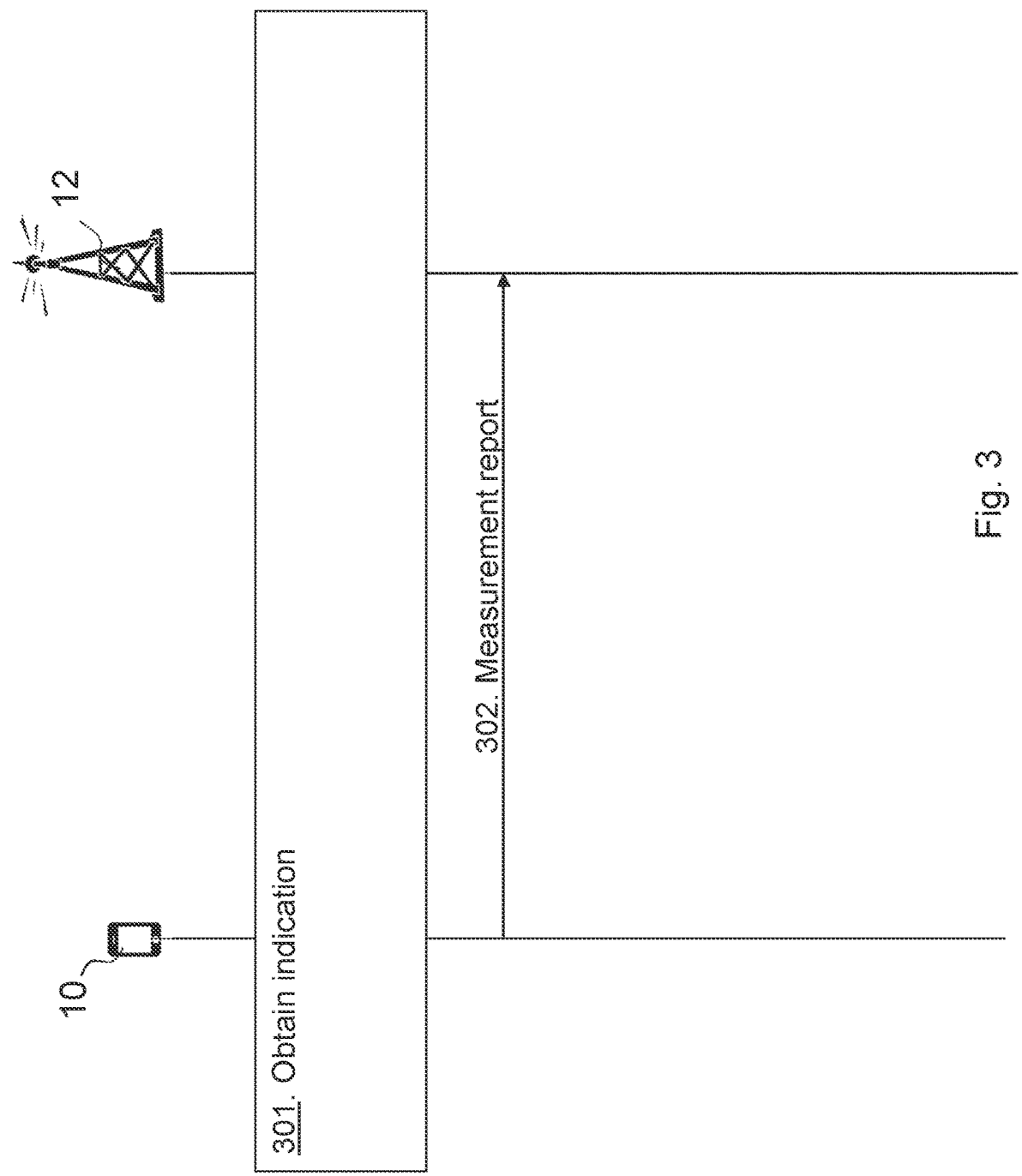
FIG. 3 is a combined flowchart and signalling scheme according to some embodiments herein.

FIG. 3 is a combined flowchart and signaling scheme according to some embodiments herein.

Action 301. The wireless device 10 obtains the indication indicating which beams to be included in a cell quality derivation. The indication may be included in a measurement configuration received from a radio network node 12. The wireless device 10 may e.g. obtain a list e.g. a black-CellList in LTE. The blackCellList is a list of cells that are not allowed to trigger a measurement report. Similarly, the wireless device 10 may obtain a list of beams, e.g. blackBeamList in NR. The blackBeamList in NR may indicate to the wireless device 10 to not include those beams in the cell quality derivation function. The list of beams to be excluded may be provided in a measurement object information element. The beams in the list may be indicated by using either individual beam indexes, or a range of beam indices. This applies to both SS block beams and CSI-RS beams. For CSI-RS additionally the radio network node 12 may indicate the beams to be made part of the list using a sequence generator code used to derive CSI-RS such that CSI-RSs representing a certain TRP can be excluded. The list may be part of a report configuration, e.g. a measurement configuration in the report configuration. This could be useful when the grouping of beams to derive group level quality is provided in the report configuration. The list may be per cell or per frequency, and the list may be provided from the radio network node 12.

In some embodiments, the wireless device 10 may obtain a list of beams, e.g. a white list includeBlackBeam. In this case, a parameter e.g. a includeBlackBeam, is provided to wireless device 10 to indicate if the beams in the list is allowed to be included in the measurement report or not. If the parameter such as the includeBlackBeam is set to true, then the wireless device 10 may include the beam, only if such a beam is found relevant based on beam report configuration i.e., this beam was found to be strong enough to be included in the measurement report if it was not part of the list of black listed beams, even though this beam is not used in cell quality derivation. In some embodiments, the white list of beams can indicate to the wireless device 10 to report quality measure and/or index of detected beam.

Action 302. The wireless device 10 may further generate and transmit the measurement report, which measurement report is based (taking into account) on the obtained indication. The report may be used to decide the cell quality derivation.

The method actions performed by the wireless device 10 for handling communication in the wireless communication network 1 according to embodiments herein will now be described with reference to a flowchart depicted in FIG. 4A. The actions do not have to be taken in the order stated below, but may be taken in any suitable order. Actions performed in some embodiments are marked with dashed boxes.

Action 401. The wireless device 10 obtains the indication indicating which beams to be included in a cell quality derivation of a cell e.g. indicating the beams to be excluded in the cell quality derivation. The wireless device 10 may receive a list, e.g. black list, informing the wireless device 10 about which beams are supposed to be excluded from the cell quality derivation. The indication may be included in a measurement configuration received from the radio network node 12. The wireless device 10 may obtain the indication by obtaining a parameter indicating whether a beam in a list, e.g., white list, is allowed to be included in a measurement report or not. The wireless device 10 may obtain the list indicating the beam to be excluded, from e.g. the radio network node 12. The radio network node 12 may indicate to the wireless device 10 for a given frequency which synchronization signal blocks (SSBs) should actually be considered for the cell quality derivation.

Action 402. The wireless device 10 performs one or more measurements on one or more beams, which one or more beams are selected based on the obtained indication.

Action 403. The wireless device 10 may perform a signal quality derivation of the cell taking the received indication into account.

Action 404. The wireless device 10 may transmit one or more measurement reports, which one or more measurement reports comprise a respective value of the one or more measurements performed. E.g. the wireless device 10 may generate and transmit the measurement report based on the received indication. The wireless device 10 may further take into account the parameter and/or the list.

Figure 4B:
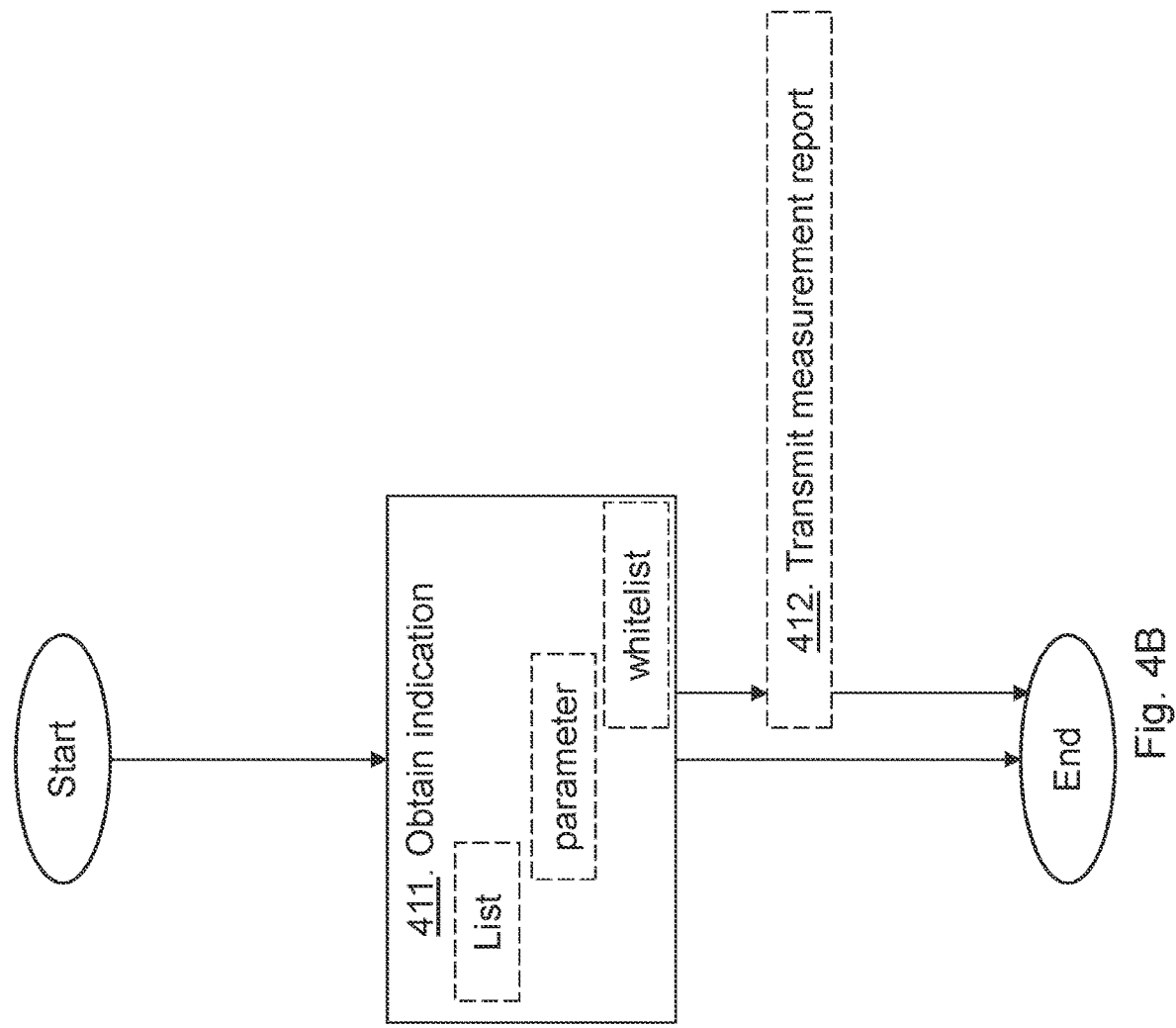
FIG. 4B is a flowchart depicting a method performed by a radio network node according to embodiments herein.

The method actions performed by the radio network node 12 for handling communication in the wireless communication network 1 according to embodiments herein will now be described with reference to a flowchart depicted in FIG. 4B. The actions do not have to be taken in the order stated below, but may be taken in any suitable order. Actions performed in some embodiments are marked with dashed boxes.

Action 411. The radio network node 12 may determine the beams to be included or excluded in the cell quality derivation at the wireless device 10. E.g. based on the load in each beam direction i.e., if the load on the cell is coming mainly in one direction from one beam, then the radio network node 12 may request wireless devices in some other beams to exclude the overloaded beam from their cell quality derivation. In another use case, a beam or set of beams covering a factory region may be barred for wireless devices that are not of particular type (service type). So, for the outside wireless devices the cell can configure the measurement object to exclude the beams covering the factory.

Action 412. The radio network node 12 transmits the indication to the wireless device 10, wherein the indication indicates which beams to be included in a cell quality derivation of a cell at the wireless device 10. The indication may be a list, e.g. black list informing the wireless device 10 about which beams are supposed to be excluded from the cell quality derivation. The indication may be included in a measurement configuration. The radio network node 12 may transmit a parameter indicating whether a beam in a list, e.g. white list, is allowed to be included in a measurement report or not. The radio network node 12 may indicate to the wireless device 10 for a given frequency which SSBs should be considered for cell quality derivation. A list may be provided which indicates the beams to be included in a cell quality derivation.

Figure 5:
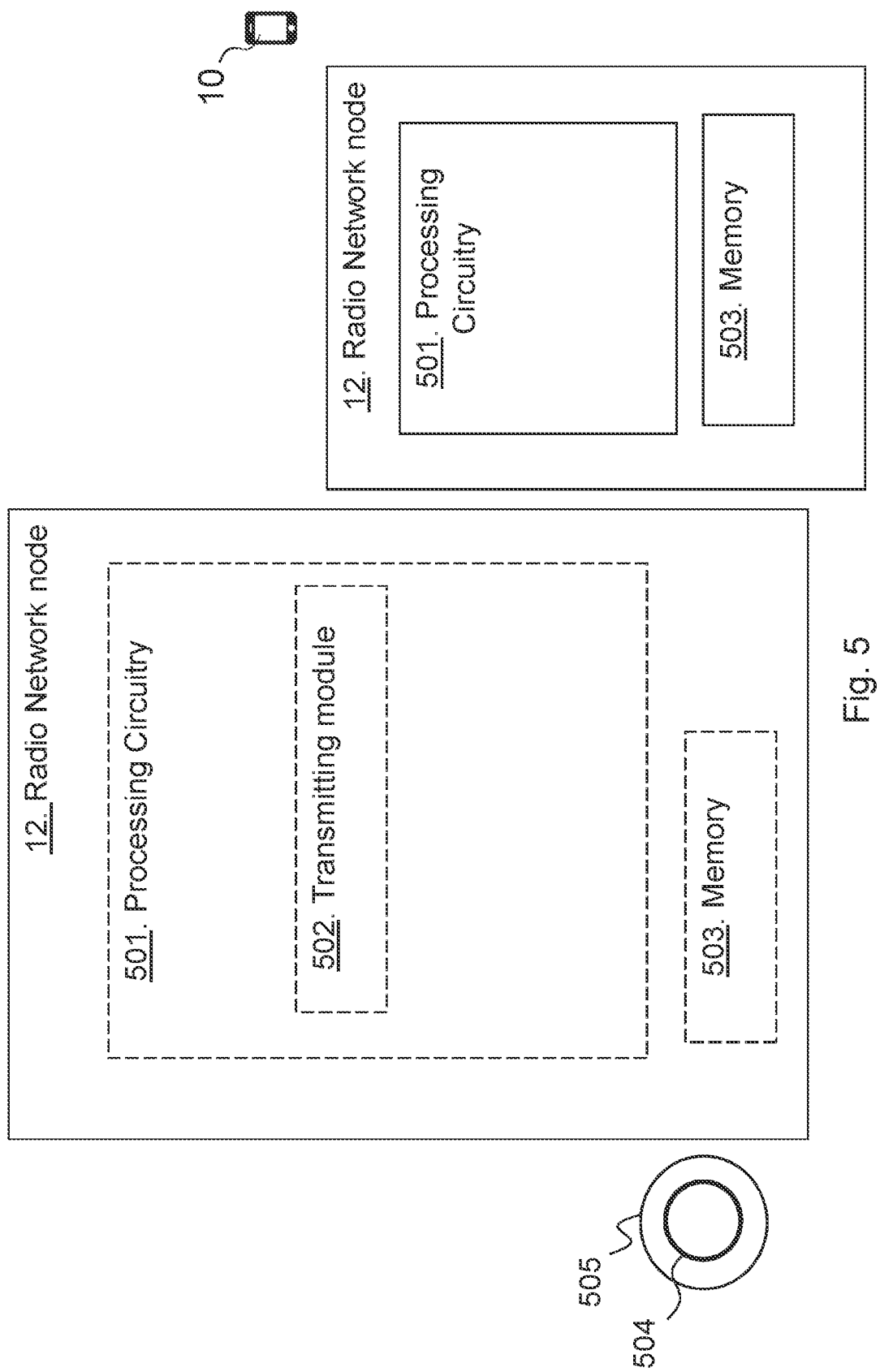
FIG. 5 is a schematic block diagram depicting a radio network node according to embodiments herein.

FIG. 5 is a schematic block diagram depicting the radio network node 12, in two embodiments, for enabling communication e.g. configuring the wireless device 10, for the wireless device 10 in the wireless communication network 1.

The radio network node 12 may comprise processing circuitry 501, e.g. one or more processors, configured to perform the methods herein.

The radio network node 12 may comprise a transmitting module 502, e.g. a transmitter, a transceiver, or similar. The radio network node 12, the processing circuitry 501, and/or the transmitting module 502 is configured to transmit the indication to the wireless device 10. The indication indicates which beams to be included in a cell quality derivation of a cell at the wireless device 10. The radio network node 12, the processing circuitry 501, and/or the transmitting module 502 may be configured to transmit the indication by transmitting a parameter indicating whether a beam in a list is allowed to be included in a measurement report or not. The indication may be a list informing the wireless device 10 about which beams are supposed to be excluded from the cell quality derivation. The indication may be included in a measurement configuration. The radio network node 12 and/or the processing circuitry 501 may be configured to determine the beams to be included or excluded in a cell quality derivation at the wireless device 10.

The radio network node 12 further comprises a memory 503 comprising one or more memory units. The memory 503 comprises instructions executable by the processing circuitry 501 to perform the methods herein when being executed in the radio network node 12. The memory 503 is arranged to be used to store e.g. information, data such as the configuration data, beams, black lists, white lists, lists parameters, beamforming parameters, etc.

The methods according to the embodiments described herein for the radio network node 12 are respectively implemented by means of e.g. a computer program product 504 or a computer program, comprising instructions, i.e., software code portions, which, when executed on at least one processor, cause the at least one processor to carry out the actions described herein, as performed by the radio network node 12. The computer program product 504 may be stored on a computer-readable storage medium 505, e.g. a disc, a universal serial bus (USB) stick, or similar. The computer-readable storage medium 505, having stored thereon the computer program product, may comprise the instructions which, when executed on at least one processor, cause the at least one processor to carry out the actions described herein, as performed by the radio network node 12. In some embodiments, the computer-readable storage medium may be a non-transitory computer-readable storage medium. Thus, the radio network node 12 may comprise the processing circuitry and the memory, said memory comprising instructions executable by said processing circuitry whereby said radio network node 12 is operative to perform the methods herein. The radio network node 12 may further comprise one or more antennas.

Figure 6:
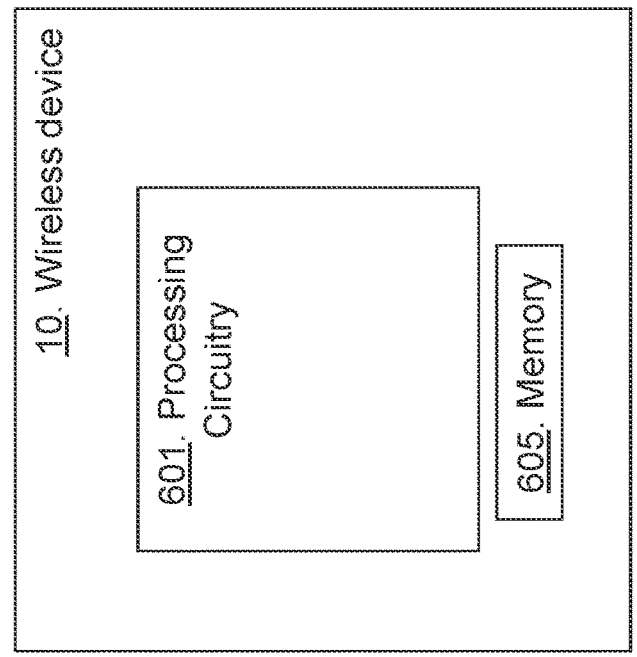
FIG. 6 is a schematic block diagram depicting a wireless device according to embodiments herein.
Figure 6:
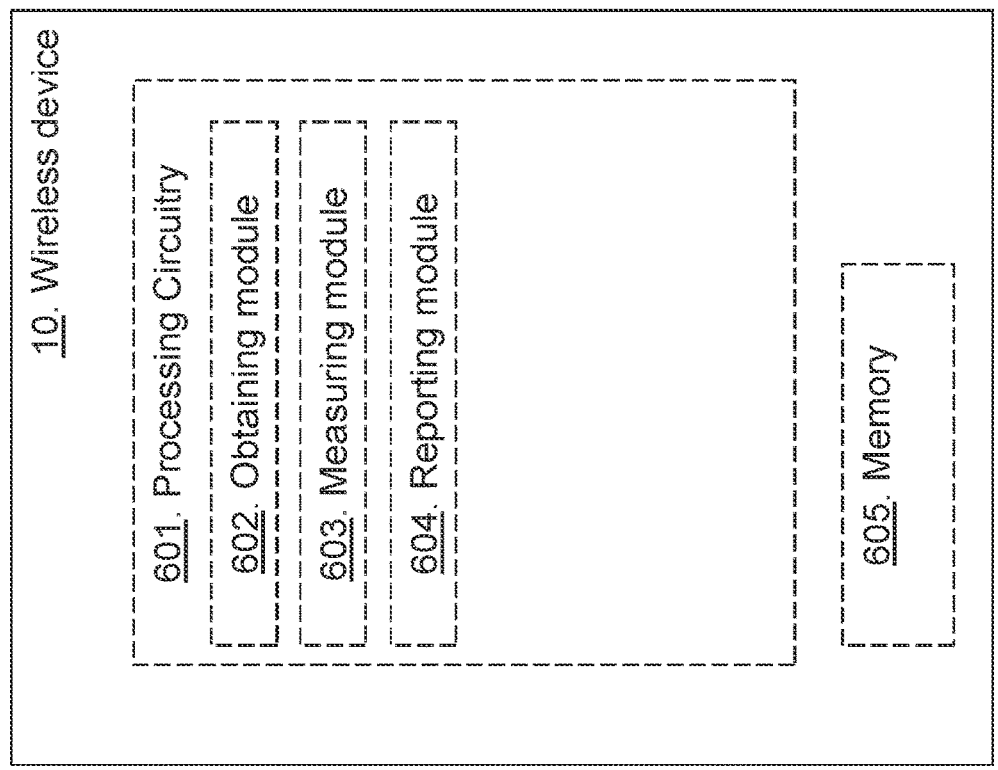
Figure 6:
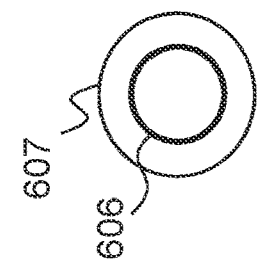

FIG. 6 is a schematic block diagram depicting the wireless device 10, in two embodiments, for handling communication in the wireless communication network.

The wireless device 10 may comprise processing circuitry 601, e.g. one or more processors, configured to perform the methods herein.

The wireless device 10 may comprise an obtaining module 602, e.g. a receiver or a transceiver. The wireless device 10, the processing circuitry 601, and/or the obtaining module 602 is configured to obtain the indication indicating which beams to be included in a cell quality derivation of a cell. The wireless device 10, the processing circuitry 601, and/or the obtaining module 602 may be configured to obtain the indication by receiving a list informing the wireless device 10 about which beams are supposed to be excluded from the cell quality derivation. The indication may be included in a measurement configuration received from the radio network node 12. The wireless device 10, the processing circuitry 601, and/or the obtaining module 602 may further be configured to obtain the indication by obtaining a parameter indicating whether a beam in a list is allowed to be included in a measurement report or not.

The wireless device 10 may further be configured to perform a signal quality derivation of the cell taking the received indication into account The wireless device 10 may comprise a measuring module 603. The wireless device 10, the processing circuitry 601, and/or the measuring module 603 may be configured to measure one or more beams, which one or more beams are selected based on the obtained indication. The wireless device 10 may be configured to perform signal quality derivation taking the received indication into account.

The wireless device 10 may comprise a reporting module 604. The wireless device 10, the processing circuitry 601, and/or the reporting module 604 may be configured to transmit one or more measurement reports, which one or more measurement reports comprises a respective value of the one or more measurements performed. The wireless device 10, the processing circuitry 601, and/or the reporting module 604 may be configured to generate and transmit the measurement report.

The wireless device 10 further comprises a memory 605 comprising one or more memory units. The memory 605 comprises instructions executable by the processing circuitry 601 to perform the methods herein when being executed in the wireless device 10. The memory 605 is arranged to be used to store e.g. information, data such as configurations, indications, measurements, etc.

The methods according to the embodiments described herein for the wireless device 10 are respectively implemented by means of e.g. a computer program product 606 or a computer program, comprising instructions, i.e., software code portions, which, when executed on at least one processor, cause the at least one processor to carry out the actions described herein, as performed by the wireless device 10. The computer program product 606 may be stored on a computer-readable storage medium 607, e.g. a disc, a USB stick or similar. The computer-readable storage medium 607, having stored thereon the computer program product, may comprise the instructions which, when executed on at least one processor, cause the at least one processor to carry out the actions described herein, as performed by the wireless device 10. In some embodiments, the computer-readable storage medium may be a non-transitory computer-readable storage medium. Thus, the wireless device 10 may comprise the processing circuitry and the memory, said memory comprising instructions executable by said processing circuitry whereby said wireless device 10 is operative to perform the methods herein. The wireless device 10 may further comprise one or more antennas.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It is herein disclosed a method performed by wireless device 10 for handling communication in a wireless communication network. The wireless device 10 obtains an indication indicating which beams to be included in a cell quality derivation. The wireless device 10 may perform measurements on beams, which beams are selected based on the obtained indication. Thus, embodiments herein control the beams to be included in the cell quality derivation. E.g. a blackBeamsList may be provided e.g. included in a measurement configuration such as in measurement object or in reporting configuration, that will inform the wireless device 10 about which beams from a cell are supposed to be excluded from the cell quality derivation.

It is herein disclosed a method performed by a radio network node 12 for handling communication in a wireless communication network. The radio network node transmits an indication to a wireless device 10, wherein the indication indicates which beams to be included in a cell quality derivation at the wireless device 10. The radio network node 12 may transmit a blackBeamsList e.g. included in a measurement configuration such as in measurement object or in reporting configuration, that will inform the wireless device 10 about which beams from a cell are supposed to be excluded from the cell quality derivation.

Figure 7:
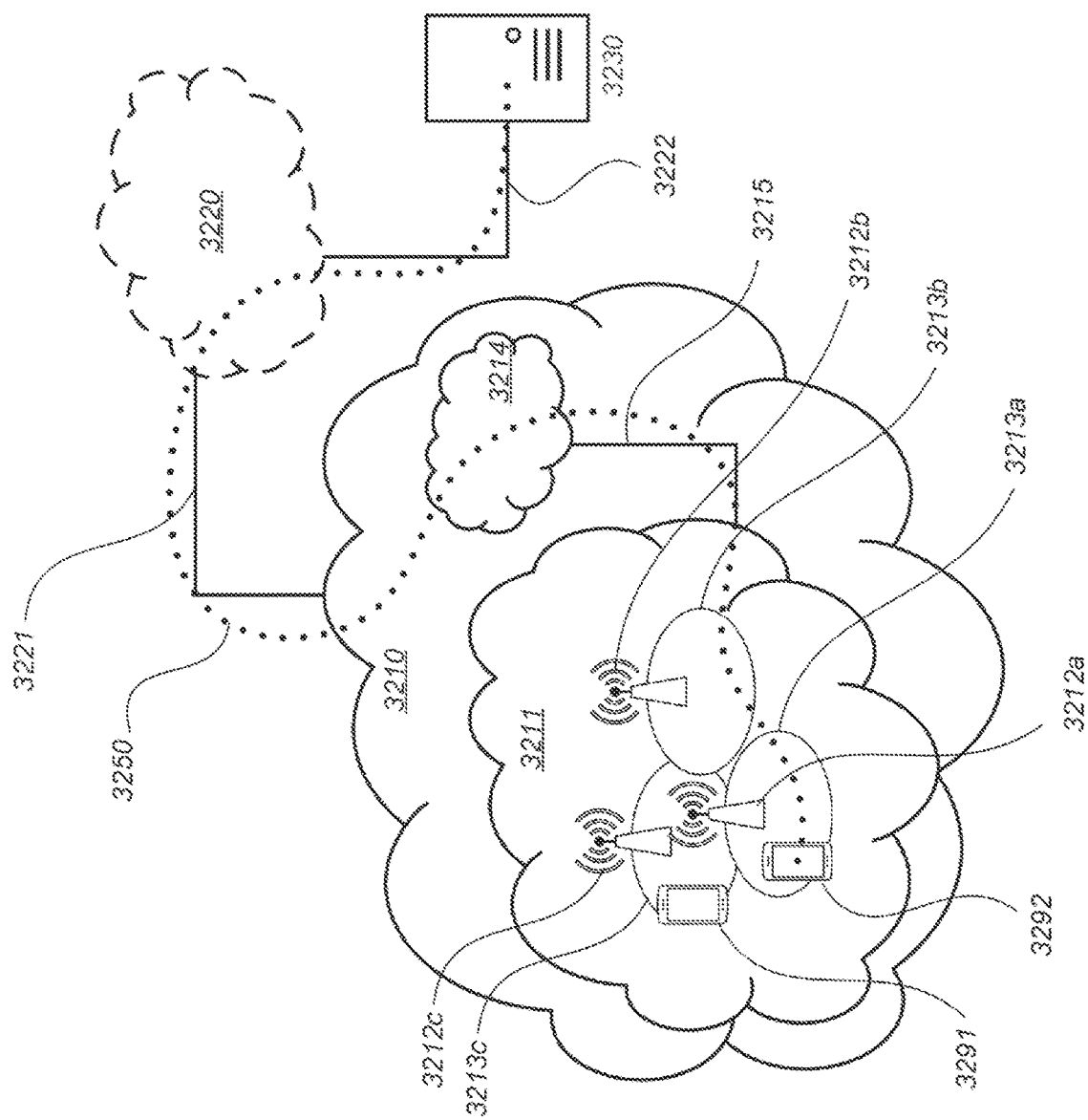
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the wireless device 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
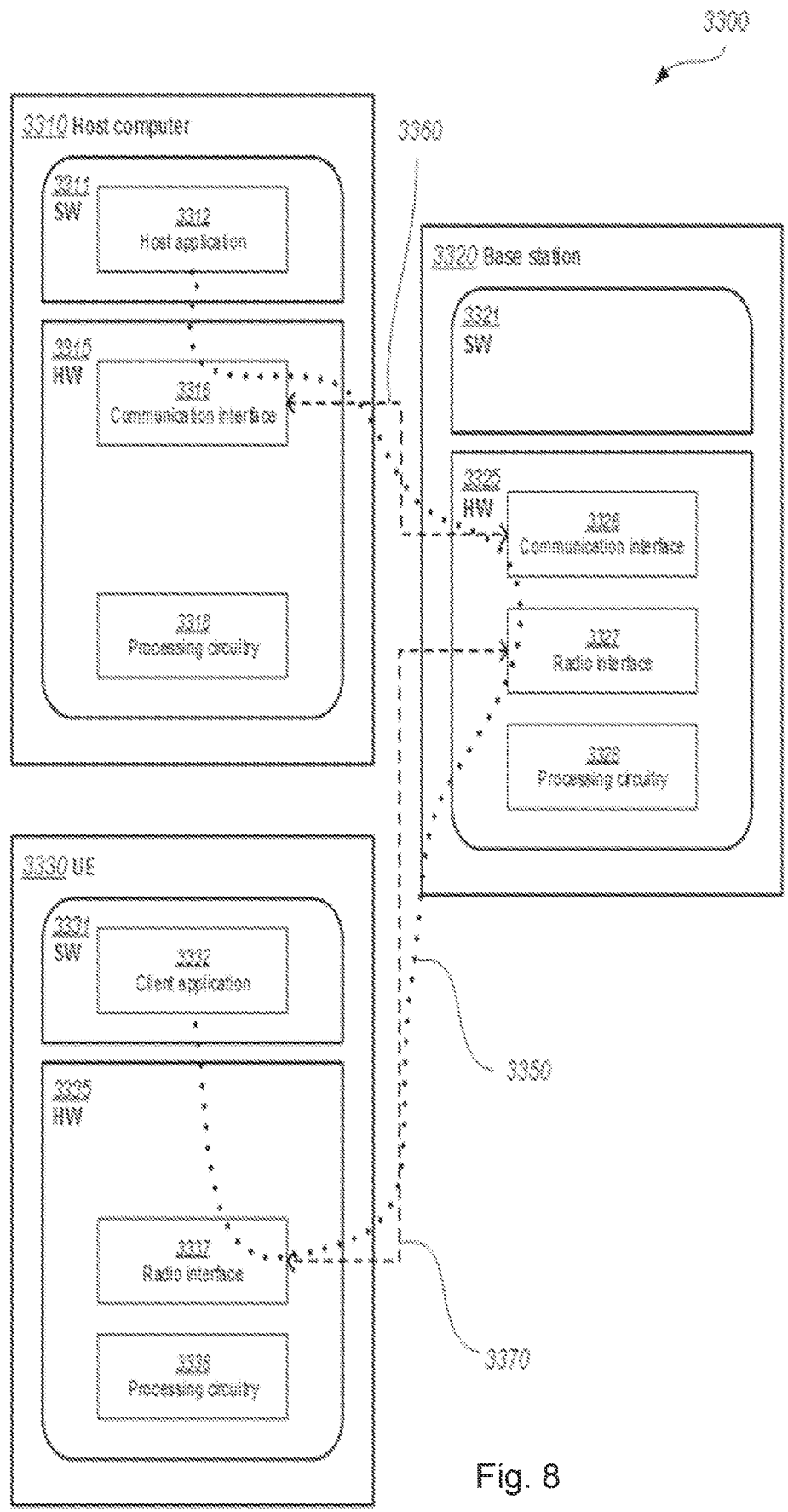
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve usage of resources since the cells or beams to use are indicated and that may affect the latency and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device for handling communication in a wireless communication network, the method comprising:
   obtaining an indication indicating which beams are to be included in a cell quality derivation of a cell; and
   performing one or more measurements on one or more beams, which one or more beams are selected based on the obtained indication.

2. The method according to claim 1, wherein obtaining the indication comprises receiving a list informing the wireless device about which beams are supposed to be excluded from the cell quality derivation.

3. The method according to claim 1, wherein the indication is included in a measurement configuration received from a radio network node.

4. The method according to claim 1, further comprising transmitting one or more measurement reports, which one or more measurement reports comprises a respective value of the one or more measurements performed.

5. The method according to claim 1, wherein obtaining the indication further comprises obtaining a parameter indicating whether a beam in a list is allowed to be included in a measurement report or not.

6. The method according to claim 1, further comprising performing a cell quality derivation of the cell taking the received indication into account.

7. The method according to claim 1, wherein cell quality derivation of the cell comprises derivation of a reference signal received power (RSRP) of the cell or comprises derivation of a reference signal received quality (RSRQ) of the cell.

8. The method according to claim 1, wherein the indication indicates which beams are to be included in the cell quality derivation of the cell by indicating on which beams the wireless device is to perform measurements from which cell quality of the cell is to be derived.

9. The method according to claim 1, wherein the one or more beams correspond to one or more synchronization signal (SS) blocks.

10. A method performed by a radio network node for handling communication in a wireless communication network, comprising
   transmitting an indication to a wireless device, wherein the indication indicates which beams are to be included in a cell quality derivation of a cell at the wireless device.

11. The method according to claim 10, wherein the indication is a list informing the wireless device about which beams are supposed to be excluded from the cell quality derivation.

12. The method according to claim 10, wherein the indication is included in a measurement configuration.

13. The method according to claim 10, further comprising determining the beams to be included or excluded in the cell quality derivation at the wireless device.

14. The method according to claim 10, wherein transmitting the indication further comprises transmitting a parameter indicating whether a beam in a list is allowed to be included in a measurement report or not.

15. The method according to claim 10, wherein the indication indicates which beams are to be included in the cell quality derivation of the cell by indicating on which beams the wireless device is to perform measurements from which cell quality of the cell is to be derived.

16. The method according to claim 10, wherein the beams correspond to synchronization signal (SS) blocks.

17. A wireless device for handling communication in a wireless communication network, wherein the wireless device comprises processing circuitry configured to:
   obtain an indication indicating which beams are to be included in a cell quality derivation of a cell; and to
   perform one or more measurements on one or more beams, which one or more beams are selected based on the obtained indication.

18. The wireless device according to claim 17, wherein processing circuitry is configured to obtain the indication by receiving a list informing the wireless device about which beams are supposed to be excluded from the cell quality derivation.

19. The wireless device according to claim 17, wherein the indication is included in a measurement configuration received from a radio network node.

20. The wireless device according to claim 17, wherein the processing circuitry is further configured to:
   transmit one or more measurement reports, which one or more measurement reports comprises a respective value of the one or more measurements performed.

21. The wireless device according to claim 17, wherein the processing circuitry is configured to obtain the indication by obtaining a parameter indicating whether a beam in a list is allowed to be included in a measurement report or not.

22. The wireless device according to claim 17, wherein the processing circuitry is further configured to:
   perform a signal quality derivation of the cell taking the received indication into account.

23. The wireless device according to claim 17, wherein the indication indicates which beams are to be included in the cell quality derivation of the cell by indicating on which beams the wireless device is to perform measurements from which cell quality of the cell is to be derived.

24. The wireless device according to claim 17, wherein the one or more beams correspond to one or more synchronization signal (SS) blocks.

25. A radio network node for handling communication in a wireless communication network, wherein the radio network node comprises processing circuitry configured to
   transmit an indication to a wireless device, wherein the indication indicates which beams are to be included in a cell quality derivation of a cell at the wireless device.

26. The radio network node according to claim 25, wherein the indication is a list informing the wireless device about which beams are supposed to be excluded from the cell quality derivation.

27. The radio network node according to claim 25, wherein the indication is included in a measurement configuration.

28. The radio network node according to claim 25, wherein the processing circuitry is configured to determine the beams to be included or excluded in a cell quality derivation at the wireless device.

29. The radio network node according to claim 25, wherein the processing circuitry is configured to transmit the indication by transmitting a parameter indicating whether a beam in a list is allowed to be included in a measurement report or not.

30. The radio network node according to claim 25, wherein the indication indicates which beams are to be included in the cell quality derivation of the cell by indicating on which beams the wireless device is to perform measurements from which cell quality of the cell is to be derived.

31. The radio network node according to claim 25, wherein the one or more beams correspond to one or more synchronization signal (SS) blocks.

32. The wireless device according to claim 17, wherein the cell comprises multiple beams, wherein the indication indicates which proper subset of beams in the cell are to be included in the cell quality derivation of the cell.

33. The radio network node according to claim 25, wherein the cell comprises multiple beams, wherein the indication indicates which proper subset of beams of the cell are to be included in the cell quality derivation of the cell.

* * * * *

UNITED STATES PATENT AND TRADEMARK OFFICE
CERTIFICATE OF CORRECTION

| | |
|---|---|
| PATENT NO. | : 11,937,112 B2 |
| APPLICATION NO. | : 17/356841 |
| DATED | : March 19, 2024 |
| INVENTOR(S) | : Ramachandra et al. |

It is certified that error appears in the above-identified patent and that said Letters Patent is hereby corrected as shown below:

In the Specification

In Column 1, Line 8, delete "2018," and insert -- 2018, now U.S. Pat. No. 11,082,872, --, therefor.

In Column 1, Line 42, delete "network" and insert -- System --, therefor.

In Column 3, Line 47, delete "Layer (PHY)" and insert -- (PHY) Layer --, therefor.

In Column 3, Line 47, delete "Layer" and insert -- Control --, therefor.

In Column 3, Line 49, delete "Control" and insert -- Protocol --, therefor.

In Column 5, Line 48, delete "(WiMax)," and insert -- (WiMAX), --, therefor.

In Column 6, Line 11, delete "Node B" and insert -- NodeB --, therefor.

In Column 9, Line 37, delete "account" and insert -- account. --, therefor.

In Column 13, Line 12, delete "which it" and insert -- which --, therefor.

In Column 13, Line 48, delete "etc.; the" and insert -- etc. The --, therefor.

Signed and Sealed this
Seventeenth Day of September, 2024

Katherine Kelly Vidal
*Director of the United States Patent and Trademark Office*